United States Patent
Kowalski et al.

(10) Patent No.: US 9,016,809 B2
(45) Date of Patent: Apr. 28, 2015

(54) TRACK SHOE AND PIN REMOVAL SYSTEM

(71) Applicant: Caterpillar Global Mining LLC, Oak Creek, WI (US)

(72) Inventors: Thomas Kowalski, Franklin, WI (US); Mark Schadler, Franklin, WI (US)

(73) Assignee: Caterpillar Global Mining LLC, Oak Creek, WI (US)

( * ) Notice: Subject to any disclaimer, the term of this patent is extended or adjusted under 35 U.S.C. 154(b) by 341 days.

(21) Appl. No.: 13/715,445

(22) Filed: Dec. 14, 2012

(65) Prior Publication Data

US 2014/0167498 A1     Jun. 19, 2014

(51) Int. Cl.
*B62D 55/21* (2006.01)
*B62D 55/32* (2006.01)

(52) U.S. Cl.
CPC ................ *B62D 55/21* (2013.01); *B62D 55/32* (2013.01)

(58) Field of Classification Search
CPC ................................ B62D 55/21; B62D 55/32
USPC ................ 305/185, 196, 198, 200, 201, 202; 29/428, 429, 430, 431–434
See application file for complete search history.

(56) References Cited

U.S. PATENT DOCUMENTS

| | | | | |
|---|---|---|---|---|
| 4,149,758 | A * | 4/1979 | Livesay | 305/118 |
| 4,150,856 | A * | 4/1979 | Hakkenberg et al. | 305/106 |
| 4,306,753 | A * | 12/1981 | Livesay et al. | 305/201 |
| 4,413,862 | A * | 11/1983 | Ragon | 305/146 |
| 4,433,874 | A | 2/1984 | Melvin | |
| 5,938,300 | A * | 8/1999 | Fukuda et al. | 305/191 |
| 7,156,185 | B2 * | 1/2007 | Juncker | 172/292 |
| 8,104,846 | B2 * | 1/2012 | Porubcansky et al. | 305/145 |
| 2003/0217454 | A1 * | 11/2003 | Maguire et al. | 29/428 |
| 2004/0026994 | A1 * | 2/2004 | Verheye et al. | 305/143 |
| 2005/0151421 | A1 | 7/2005 | Colwell et al. | |
| 2008/0023683 | A1 * | 1/2008 | Reynolds et al. | 254/89 R |

* cited by examiner

*Primary Examiner* — S. Joseph Morano
*Assistant Examiner* — Jean Charleston
(74) *Attorney, Agent, or Firm* — Foley & Lardner LLP

(57) ABSTRACT

A track for a tracked vehicle includes two or more track shoes. The track shoes include one or more links having a first link end and a second link end, one or more pins received by one or more links and movable between an installed position and a dislodged position, and one or more pockets positioned adjacent to the pin and formed to receive a hydraulic jack. A first link end of a first track shoe is configured to pivotally couple with a second link end of a second track shoe, and a second link end of a first track shoe is configured to pivotally couple with a first link end of a third track shoe. The track may also include a pin removal system configured to dislodge the pin from the track.

20 Claims, 3 Drawing Sheets

TRACK SHOE AND PIN REMOVAL SYSTEM

TECHNICAL FIELD

This disclosure relates to track-driven vehicles, and particularly to a track shoe and a pin removal system for track-driven vehicles.

BACKGROUND

This section is intended to provide a background or context to the invention recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Tracked vehicles, such as track-driven mining vehicles, run on continuous tracks comprising a system of vehicle propulsion in which a continuous band of treads is driven by two or more wheels. The tracks provide a large area of support contact with the ground so that the vehicles can be used on many different types of terrain. The tracks are typically built from a series of segments, or shoes, pivotally connected by a plurality of pivot pins mounted in bushings within the shoes. The pivotally connected shoes provide flexibility to the track, wrapping around the set of wheels to make an endless loop.

The shoes and/or pins of the track may be damaged or become worn from continued use, and require removal for replacement or repair. In order to remove a shoe from the track, the pin must be removed from the bushing. Typically, the pins are bent or otherwise damaged as the tracks encounter normal wear and tear (e.g. on uneven terrain, etc.), making the pins more difficult to remove from the shoes. In conventional track shoes, the pins are typically removed by utilizing a lug welded to the end of the pin. A come-along (i.e. hand operated ratchet lever winch) is then attached to the lug, or a large towing force (e.g. a truck) is applied to the pin, pulling the pin from the shoe. Removing the track shoe pins from these conventional track shoes using such tedious methods and rudimentary equipment can be time-consuming, causing unnecessary vehicle downtime. Also, conventional pin removal often damages other components of the vehicle.

An example of a conventional crawler shoe can be found in U.S. Pat. No. 6,929,335, issued Aug. 16, 2005, for "Crawler Shoe with Peening Pads in Roller Path." This patent discloses crawler shoes that are connected to one another by removable, replaceable pins. The pins permit articulation of adjacent shoes and are removed to replace the shoes as the shoes become worn.

SUMMARY

An embodiment of the present disclosure relates to a track for a tracked vehicle. The track includes two or more track shoes. The track shoes include one or more links having a first link end and a second link end, the first and second link ends configured to receive a pin. The track shoes also include one or more pins received by one or more links and movable between an installed position and a dislodged position, the pin being configured to pivotally couple one or more first link ends to one or more second link ends when in the installed position. The track shoes further include one or more pockets positioned adjacent to the pin and formed to receive a hydraulic jack, and a surface configured to receive a force from a hydraulic jack. In this embodiment, a first link end of a first track shoe is configured to pivotally couple with a second link end of a second track shoe, and a second link end of a first track shoe is configured to pivotally couple with a first link end of a third track shoe.

Another embodiment of the present disclosure relates to a track shoe for a tracked vehicle. The track shoe includes a link having a first link end and a second link end, the first and second link ends configured to receive a pin. The track shoe also includes one or more pins received by the link and movable between an installed position and a dislodged position, the pins being configured to pivotally couple a first link end of a first track shoe to a second link end of a second track shoe when in the installed position. The track shoe further includes one or more sidewalls and end walls defining a pocket positioned adjacent to the pin and sized to receive a hydraulic jack, and at least one substantially planar surface substantially perpendicular to the pin and configured to receive a force from a hydraulic jack.

Another embodiment of the present disclosure relates to a tracked vehicle. The tracked vehicle includes one or more continuous tracks each having two or more track shoes. The track shoes include one or more links having a first link end and a second link end, the first and second link ends configured to receive a pin. The track shoes also include one or more pins received by one or more links and movable between an installed position and a dislodged position, the pin being configured to pivotally couple one or more first link ends to one or more second link ends when in the installed position. The track shoes further include one or more pockets positioned adjacent to the pin and formed to receive a hydraulic jack, and a surface configured to receive a force from a hydraulic jack. In this embodiment, a first link end of a first track shoe is configured to pivotally couple with a second link end of a second track shoe, and a second link end of a first track shoe is configured to pivotally couple with a first link end of a third track shoe.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
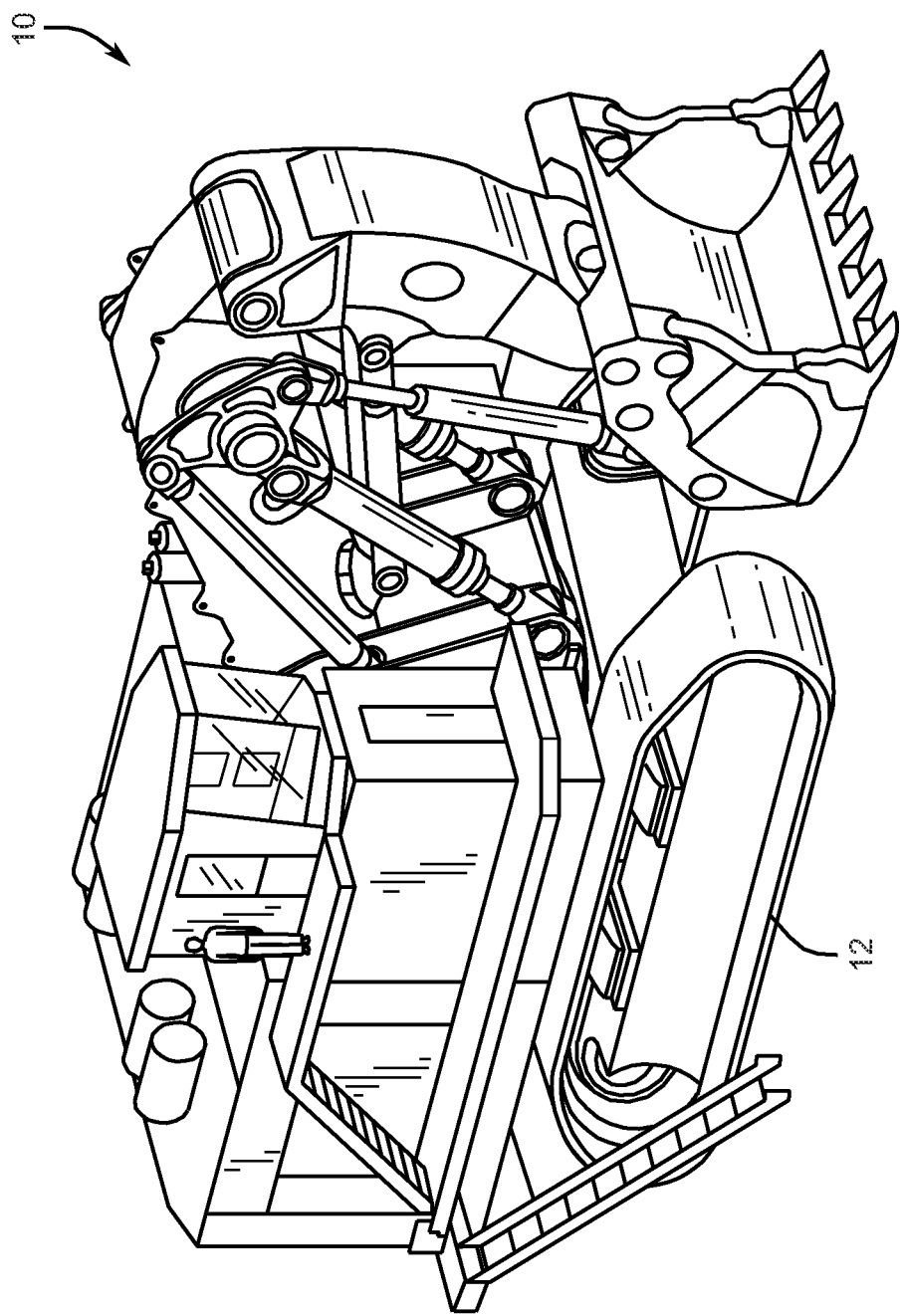
FIG. 1 is a perspective view of a track-driven mining vehicle, according to an exemplary embodiment.

Referring to FIG. 1, a track-driven mining vehicle 10 is shown, according to an exemplary embodiment. The vehicle 10 travels by a continuous band of tracks 12 driven by two or more wheels, in exemplary embodiments. The tracks 12 are formed by a series of segments, or track shoes 22 (shown in FIG. 2). The shoes 22 are pivotally coupled by a plurality of pivot pins 24 (shown in FIG. 2) mounted in bushings within the track shoes 22. The pivotally connected shoes 22 provide a flexible track 12, forming a rounded shape configured to traverse mining surfaces, including uneven terrain.

Figure 2:
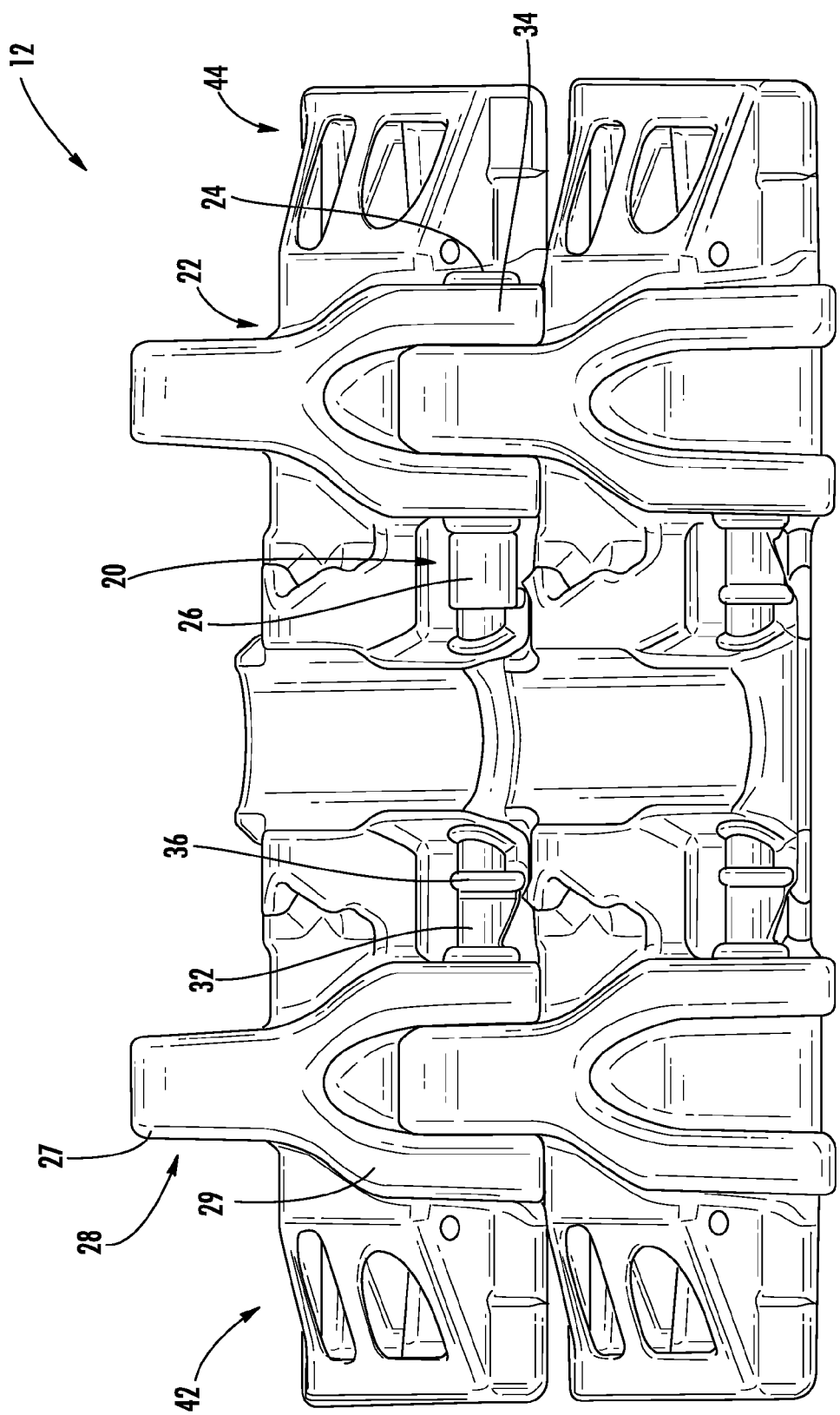
FIG. 2 is a front view of track shoes coupled by pin assemblies, including the pin removal system of the present disclosure in the non-actuated position, according to an exemplary embodiment.
Figure 3:
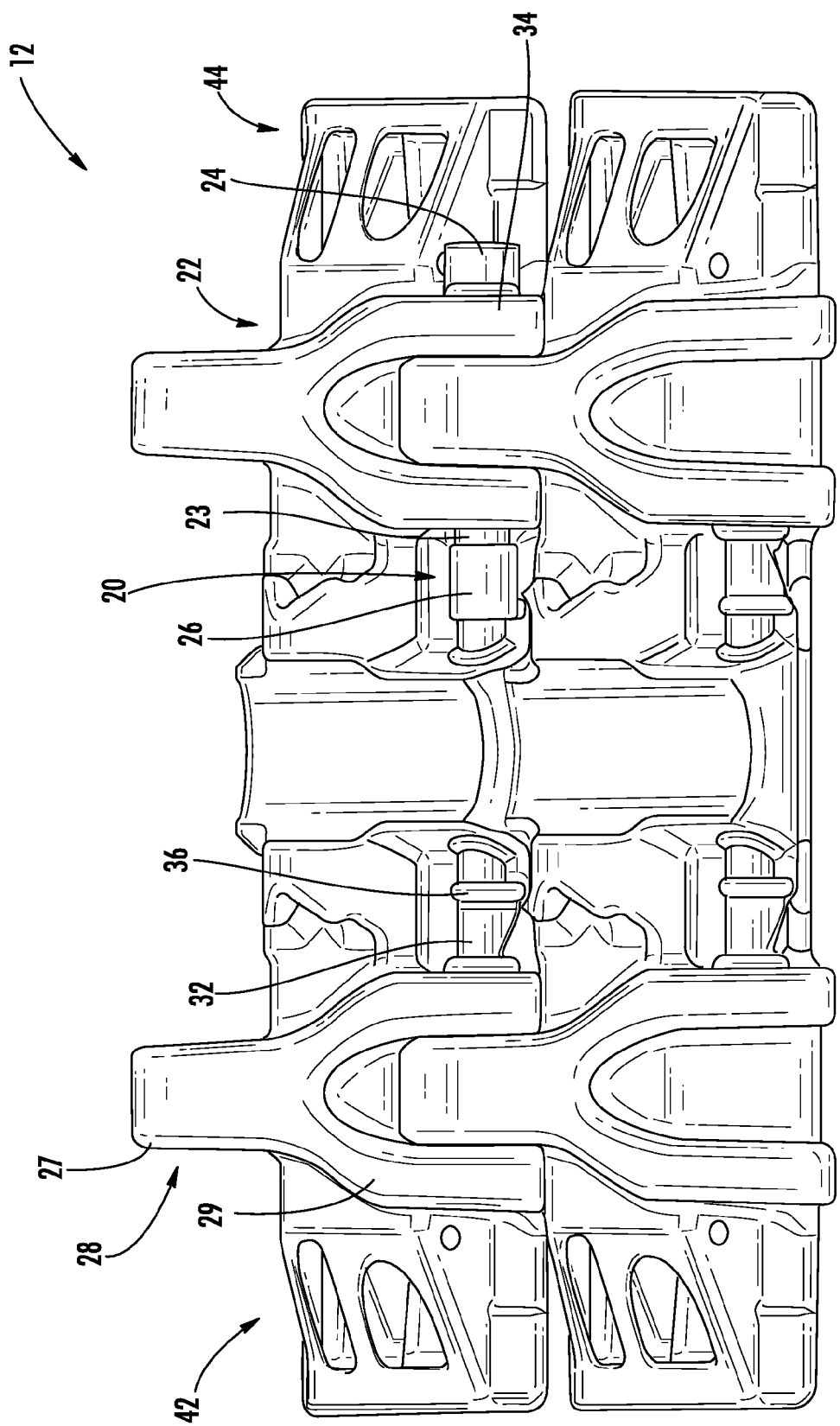
FIG. 3 is a front view of track shoes coupled by pin assemblies, including the pin removal system of the present disclosure in the actuated position, according to an exemplary embodiment.

Referring now to FIGS. 2 and 3, a front view of a portion of track 12 for a tracked vehicle 10 (e.g. mining shovel, excavator, tractor, etc.) is shown, according to an exemplary embodiment. The track 12 includes one or more track shoes 22. The track shoes 22 each include one or more links 28 configured to couple a first track shoe 22 to a second track shoe 22, etc., forming the track 12. In the illustrated embodiment of FIGS. 2 and 3, the link 28 has a Y-shape, including a dual-prong portion 29 and a single-prong portion 27 of an adjacent link 28. The dual-prong portion 29 is formed to mate with the single-prong portion 27. The portions 27 and 29 form a connection passage 34 for coupling one or more track shoes 22. The single-prong portion 27 of the link 28 is configured to overlap with an adjacent track shoe 22, and the dual-prong portion 29 is configured to receive the single-prong portion 27. The connection passage 34 in the single-prong portion 27 and the dual-prong portion 29 are both axially aligned and configured to receive a pin 24 therethrough. The pin 24 is inserted through the dual-prong portion 29 and the single-prong portion 27, pivotally coupling two track shoes 22. In exemplary embodiments, the track shoes 22 are configured to pivot about an axis defined by the connection passage 34 for each shoe 22, providing a flexible track 12. The pin 24 is retained within the connection passage 34 by a removable keeper pin (not shown), which in exemplary embodiments is inserted through the pin 24 and into the shoe 22, securing the pin 24.

A pin removal system 20 is also shown in FIGS. 2 and 3, according to an exemplary embodiment. The pin removal system 20 is configured to remove the pin 24 from the track shoe 22, so that the track shoe 22 can be removed from the track 12. For instance, the track shoe 22 may need to be removed from the track 12 in order to repair or replace the shoe 22. The pin removal system 20 includes a hydraulic jack 26 configured to be received in a receptacle 32 (e.g. pocket, etc.) and engage the pin 24. The hydraulic jack 26 (e.g. power pack, etc.) is sized to fit the pin 24, and to provide the force necessary to dislodge the pin 24 from the connection passage 34. The hydraulic jack 26 has a non-actuated position (shown in FIG. 2) for installation and removal of the jack 26 from the pocket 32 and an actuated position (shown in FIG. 3) for dislodging the pins 24. The hydraulic jack 26 is at rest in the non-actuated position. The hydraulic jack 26 is configured to receive pressurized hydraulic fluid from a fluid source (e.g. hand pump, power pack, etc.). The pressurized hydraulic fluid applies pressure to an actuator 23 (i.e. piston) within the hydraulic jack 26, providing a force which causes the piston 23 to move to the actuated position. The force applied is intended to dislodge the pin 24 from the passage 34 in track shoe 22.

The hydraulic jack 26 is received by a pocket 32 formed within the track shoe 22 and adjacent to the pin 24. The pocket 32 is a recessed area on the inboard (according to the track shoe 22) side of the pin 24 sized to receive the hydraulic jack 26. The pocket 32 is adjacent to the pin 24 and formed in a size and shape proportional to the jack 26 and in an axial or in-line arrangement (i.e. arranged in a substantially straight line) with the pin 24 and the connection passage 34. In exemplary embodiments, the pocket 32 is defined by side walls and end walls formed on the track shoe 22. The pocket 32 is configured to provide clearance on the track shoe 22 to insert the hydraulic jack 26 in-line with and inboard of the pin 24. In exemplary embodiments, the pocket 32 includes a stop 36 (i.e. a flat surface provided by the pocket 32) formed to provide a backing surface for the hydraulic jack 26. In other embodiments, the stop 36 may be a surface independent of the pocket 32, formed in a location separate from the pocket 32 on the track shoe 22. The stop 36 is formed by a substantially planar surface substantially perpendicular to the pin 24. In exemplary embodiments, the stop 36 includes a surface substantially parallel to a surface of the pin 24. The pocket 32 and stop 36 are integrated into the track shoe 22. The stop 36 is configured to provide support for the hydraulic jack 26 as the piston 23 moves from the non-actuated position to the actuated position. The stop 36 is sized to have a surface area proportional to the cylindrical surface area of the hydraulic jack 26, and may have a semi-cylindrical shape to accommodate the hydraulic jack 26. As the piston 23 extends out to the actuated position, the hydraulic jack 26 applies a force to the pin 24. The stop 36 is configured to provide support for the hydraulic jack 26 so that the force from the hydraulic jack 26 is applied in the direction of the pin 24 (according to FIGS. 2 and 3). The pin 24 is configured to move within the connection passage 34 between an installed position (shown in FIG. 2) and a dislodged position (shown in FIG. 3). As the piston 23 is extended, the hydraulic jack 26 drives the pin 24 out of the connection passage 34, moving the pin 24 from the installed position to the dislodged position.

In the illustrated embodiment of FIGS. 2 and 3, the track shoe 22 includes a left side 42 and a right side 44. The sides 42 and 44 are substantially symmetric, with the left side 42 forming a mirror image of the right side 44. In exemplary embodiments, the sides 42 and 44 each have one pin 24 received by one link 28 and one pocket 32. Each pocket 32 is formed on the inside of the track shoe 22, in-line with and inboard of the pin 24. The pocket 32 provides clearance for the hydraulic jack 26 and a stop 36 to provide a backing surface for the hydraulic jack 26. Extension of the piston 23 from the non-actuated position to the actuated position moves the pin 24 from the installed position to the dislodged position.

In exemplary embodiments, the hydraulic jack 26 receives pressurized fluid from a power pack (not shown). The power pack is a stand-alone device that may be portable. The power pack provides pressurized hydraulic fluid through a control valve, and can be configured to supply hydraulic power (i.e. pressurized hydraulic fluid) to the hydraulic jack 26. In exemplary embodiments, the power pack and hydraulic jack 26 are sized to provide a 30-ton force. The 30-ton force may be sufficient to dislodge the pins 24 typically found in the tracks 12 of large tracked vehicles 10. In other embodiments, the power pack and hydraulic jack 26 may be sized to provide a lesser or greater force, as is suitable for the particular application. The power pack may include a hydraulic reservoir holding hydraulic fluid, regulators that are configured to control the pressure of the hydraulic fluid, a hydraulic pump, and a motor to power the hydraulic pump. In other embodiments, the hydraulic jack 26 may receive a supply of pressurized hydraulic fluid from another source, including a portable hydraulic pump.

In other exemplary embodiments, the pin removal system 20 includes a fixture configured to hold the hydraulic jack 26 above the pin 24, aligning the jack 26 with the pin 24. In these embodiments, the fixture is attached to the outboard side of the track shoe 22. A bar is pinned such that a first end is configured to receive a force from the hydraulic jack 26, and a second end is configured to be driven outboard from the force of the hydraulic jack 26, contacting the pin 24. The outboard force of the bar drives the pin 24 in the outboard direction, moving the pin 24 from the installed position to the dislodged position. The fixture is configured to stabilize the hydraulic jack 26 as it moves from the non-actuated position to the actuated position.

In still other exemplary embodiments, the pin removal system 20 includes a pin 24 having a tapped hole on the outboard end of the pin 24. In these embodiments, the pin removal system 20 includes a fixture mounted on the outboard end of the pin 24, straddling the pin 24 and seated against the track shoe 22. The hydraulic jack 26 is threaded in these embodiments, configured to be received by the tapped hole of the pin 24. The hydraulic jack 26 is received by the pin 24 and seated against the fixture. In these embodiments, the piston 23 is configured to refract, pulling the pin 24 in the outboard direction from the installed position to the dislodged position.

The construction and arrangements of the track shoe and pin removal system, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

INDUSTRIAL APPLICABILITY

The disclosed track shoe and pin removal system may be implemented into any machine driven by tracks having linking components that are coupled by pins, such as track-driven mining vehicles. The disclosed track shoe and pin removal system may help reduce downtime and maintenance costs by reducing the amount of time necessary to replace or repair a track shoe. The disclosed track shoe and pin removal system may also reduce stress on the track components by providing a simple design that does not require any welding or tensioning. The disclosed track shoe and pin removal system may also increase the life of the track components by providing a pin removal system that does not damage the surrounding track components.

It will be apparent to those skilled in the art that various modifications and variations can be made to the disclosed track shoe and pin removal system. Other embodiments will be apparent to those skilled in the art from consideration of the specification and practice of the disclosed track shoe and pin removal system. It is intended that the specification and examples be considered as exemplary only, with a true scope being indicated by the following claims and their equivalents.

What is claimed is:

1. A track for a tracked vehicle, comprising:
    two or more track shoes comprising:
        one or more links having a first link end and a second link end, the first and second link ends configured to receive a pin;
        one or more pins received by one or more links and movable between an installed position and a dislodged position, the pin being configured to pivotally couple one or more first link ends to one or more second link ends when in the installed position;
        one or more pockets positioned adjacent to the pin and formed to receive a hydraulic jack;
        a surface configured to receive a force from a hydraulic jack; and
    wherein a first link end of a first track shoe is configured to pivotally couple with a second link end of a second track shoe, and a second link end of a first track shoe is configured to pivotally couple with a first link end of a third track shoe.

2. The track of claim 1, further comprising a hydraulic jack received by the pocket and configured to apply a force to the pin sufficient to move the pin from the installed position to the dislodged position.

3. The track of claim 2, further comprising a portable hydraulic assembly configured to supply pressurized fluid to the hydraulic jack.

4. The track of claim 1, wherein each first link end has a Y-shape and is configured to mate with the second link end of each other track shoe.

5. The track of claim 1, wherein the pocket is in-line with the pin, and the surface is located on the pocket in a position substantially parallel to a surface of the pin.

6. The track of claim 1, the track shoe further comprising a first side and a second side, the first side being symmetric with the second side, each side comprising one link, one pin, and one pocket.

7. The track of claim 1, wherein the pin has a tapped end configured to receive a threaded hydraulic jack.

8. A track shoe for a tracked vehicle, comprising:
    a link having a first link end and a second link end, the first and second link ends configured to receive a pin;
    one or more pins received by the link and movable between an installed position and a dislodged position, the pins being configured to pivotally couple a first link end of a first track shoe to a second link end of a second track shoe when in the installed position; and
    one or more sidewalls and end walls defining a pocket positioned adjacent to the pin and sized to receive a hydraulic jack;
    at least one substantially planar surface substantially perpendicular to the pin and configured to receive a force from a hydraulic jack.

9. The track shoe of claim 8, further comprising a hydraulic jack received by the pocket and configured to apply a force to the pin sufficient to move the pin from the installed position to the dislodged position.

10. The track shoe of claim 9, further comprising a portable hydraulic assembly configured to supply pressurized fluid to the hydraulic jack.

11. The track shoe of claim 8, wherein the first link end has a Y-shape and is configured to mate with the second link end of a second track shoe.

12. The track shoe of claim 8, wherein the pocket is in-line with the pin, and the substantially planar surface is located on the pocket in a position substantially parallel to a surface of the pin.

13. The track shoe of claim 8, further comprising a first side and a second side, the first side being symmetric with the second side, each side comprising one link, one pin, and one pocket.

14. The track shoe of claim 8, wherein the pin has a tapped end configured to receive a threaded hydraulic jack.

15. A tracked vehicle, comprising:

one or more continuous tracks each having two or more track shoes, the track shoes comprising:

one or more links having a first link end and a second link end, the first and second link ends configured to receive a pin;

one or more pins received by one or more links and movable between an installed position and a dislodged position, the pin being configured to pivotally couple one or more first link ends to one or more second link ends when in the installed position;

one or more pockets positioned adjacent to the pin and formed to receive a hydraulic jack;

a surface configured to receive a force from a hydraulic jack; and wherein a first link end of a first track shoe is configured to pivotally couple with a second link end of a second track shoe, and a second link end of a first track shoe is configured to pivotally couple with a first link end of a third track shoe.

16. The tracked vehicle of claim 15, wherein each first link end has a Y-shape and is configured to mate with the second link end of each other track shoe.

17. The tracked vehicle of claim 15, wherein the pocket is in-line with the pin, and the surface is located on the pocket in a position substantially parallel to a surface of the pin.

18. The tracked vehicle of claim 15, further comprising a hydraulic jack received by the pocket and configured to apply a force to the pin sufficient to move the pin from the installed position to the dislodged position.

19. The tracked vehicle of claim 18, further comprising a portable hydraulic assembly configured to supply pressurized fluid to the hydraulic jack.

20. The tracked vehicle of claim 15, wherein the pin has a tapped end configured to receive a threaded hydraulic jack.

* * * * *